Patented June 5, 1934

1,961,840

UNITED STATES PATENT OFFICE 1,961,840

INSECTICIDE

Elmer K. Bolton, Wilmington, Del., assignor, by mesne assignments, to The Grasselli Chemical Company, Cleveland, Ohio, a corporation of Delaware No Drawing. Application July 18, 1931, Serial No. 551,791

9 Claims. (Cl. 167—33)

I have found that substances of a certain class of organic compounds have a specific toxic effect upon harmful insects and my invention consists in the application of said substances to the destruction of insect pests.

The novel insecticides found by me belong to the class of organic, or carbon, compounds which contain in their molecule, according to accepted formulation, a ring, or nucleus, composed of carbon, nitrogen and sulfur atoms and in which one of said carbon atoms carries a salt forming group and certain derivatives thereof.

The arrangement of the atoms in the five membered ring and the other atoms or organic radicals attached to four of the members of the ring, do not seem to be of fundamental importance in respect to the toxicity of the compounds towards insects, though these factors have pronounced effects upon the degree of toxicity and other physical or chemical properties which influence the availability of the compounds as insecticides.

Among the several species of heterocyclic, five membered ring compounds containing carbon, nitrogen and sulfur, and carrying a salt forming group, the thiazole derivatives are both as to their toxicity and technical availability particularly adapted for use of combating insect pests.

The thiazoles can be represented by the skeleton formula

and the term thiazole is used for the present purposes irrespective of the saturation of the nucleus, that is to say formulation with single or double bonds between the atoms of the nucleus. As a matter of fact, many of the thiazoles exhibit properties which at present are explained by the assumption that the compounds exist as an equilibrium of two tautomeric forms which can be formulated as keto and enol type compounds, such as:

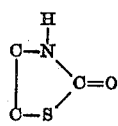

and

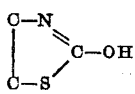

The salt forming groups which when attached to one of the carbon atoms of the five membered nucleus, whereby the insecticidal properties are fully developed, can be of an acidic or basic nature; the acidic groups can be exemplified by —SH, —OH, —S—CH$_2$—COOH, SO$_3$H, S—C—SH, and other carboxylic, etc. groups. The basic groups may be —NH$_2$ and its substitution products. Aliphatic as well as aromatic thiazoles are easily accessible by relatively simple synthetic processes. The following is a representive list of thiazole insecticides which I have found to be specifically toxic to insects:

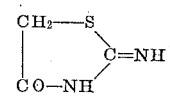

Pseudo-thio-hydantoin, or 2-imino-4-thiazolidone.

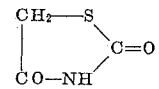

2, 4-diketo-tetrahydro-thiazole, or 2, 4-thiazoledione.

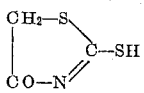

Rhodanin.

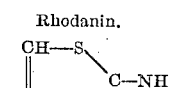

4-methyl-2-amino thizaole.

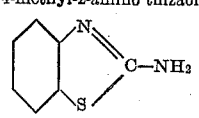

1-amino-benzo-thiazole.

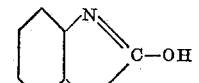

1-hydroxybenzo-thiazole.

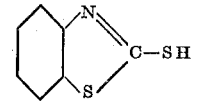

Mercapto-benzo-thiazole.

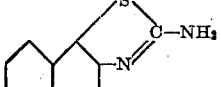

1-amino-alpha-naphtho-thiazole.

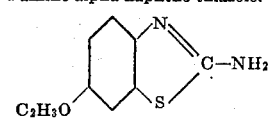

5-ethoxy-1-amino-benzo-thiazole.

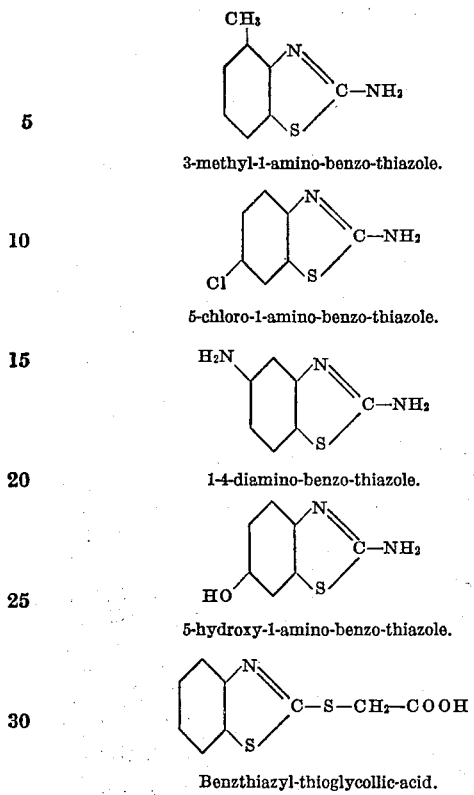

3-methyl-1-amino-benzo-thiazole.

5-chloro-1-amino-benzo-thiazole.

1-4-diamino-benzo-thiazole.

5-hydroxy-1-amino-benzo-thiazole.

Benzthiazyl-thioglycollic-acid.

These compounds all contain the five membered thiazole nucleus and a salt forming group attached to one of the carbon atoms of this nucleus.

The toxicity of these compounds towards insects is not limited to these basic or respectively acid substances and their respective salts partake in this property. The amino-thiazoles can, for instance, be combined with hydrochloric, sulfuric and many other inorganic or organic acids to form salts which exhibit in a broad manner the toxic properties of the thiazole bases, similarly the acidic thiazoles, such as the mercapto, hydroxy, carboxylic derivatives form stable salts with alkalies, ammonia, heavy metals, such as Cu, Hg, Zn, etc., organic bases, etc., and there again the insecticidal properties are carried over into the salts.

It appears furthermore that the salt forming groups of the thiazoles can be substituted without materially affecting the toxicity of the thiazole nucleus. Esters, amids or ethers and anhydrids of the acidic thiazoles have substantially the same toxicity as the free acids and their salts. Similarly the toxicity of amino thiazoles is maintained in their derivatives in which the amino group carries hydrocarbon or acyl (—O—R) substituents.

The carrying over of the insecticidal properties from the straight, salt forming thiazoles into their salts and esters etc. is of great practical importance, as it permits of changing the physical properties of the active material without materially modifying its useful toxic characteristics and gives a great latitude in the methods of applying my novel insecticides. Salt formation changes on the one hand their solubility in water, mineral oil and other vehicles used to disseminate the insecticide. Of greater importance is the fact that by combining a weak base with a strong acid a salt may be formed which shows an acid reaction in water, or vice versa, and it is thereby possible to supply the same active substance in an alkaline or acid form, as may be desired, in view of the lesser or greater tolerance of various insects for acid or alkaline materials.

In the case of the esters, and the other neutral substitution products, I found that they are more readily emulsified, in which form they may be better suited for particular applications.

It is also possible, whenever one form of the active material is injurious to vegetable matter to transform it into another derivative which, while of substantially the same toxicity to insects, is tolerated by the plants, though in general, I found that my novel insecticides are practically non-injurious to plant life.

My novel insecticides are in general most effective against sap sucking insects and belong therefor to the class of so-called "contact insecticides", though in isolated cases they can also be used as stomach poisons against leaf eating insects.

My novel insecticides are applied in a manner similar to other insecticides, mostly in the form of solutions or suspensions. While the use of spreaders in connection with suspensions or solutions of insecticides is quite common, the addition of such substances as exemplified by soaps, sulfonated mineral, vegetable or animal oils, or other wetting and sticking agents, has with my novel thiazole insecticides an unexpected, very valuable additional effect, as it not only produces a better distribution of the solutions or emulsions, but also, for some unexplained reason, enhances the toxicity of the preparations towards insects. Such solutions can also be absorbed upon inert solid carriers, or the substances can be mixed dry with finely divided solid substances and then used as dusts.

My novel insecticides have been found particularly useful for the control of various types of aphids, which can be regarded as among the most troublesome plant pests.

Aqueous solutions of from ½ to $\tfrac{1}{10}$ per cent of various thiazole compounds, such as mercapto-benzo-thiazole and its sodium salt, aminobenzo-thiazole, including its various substitution products, naphthothiazoles and their hydrochlorides, hydroxy-benzothiazoles, etc., to which a few per cent of a spreader, such as fish oil soap or a sulfonated mineral oil was added, were found to give a control of over 90% on black chrysanthemum aphis and celery aphis. Among the most effective aphicides, I found that an aqueous solution of ⅓ per cent sodium mercaptobenzothiazole, with ½ per cent fish oil soap, ½ per cent of 5-ethoxy-1-amino-thiazole hydrochloride, with ½ per cent of sulfonated mineral oil, as well as other members of this broad class of substances, gave a 100% kill of the aphids.

The use of the thiazole compounds is not limited to control of aphids, but many other harmful insects can equally well be controlled by them, it is, for instance, contemplated to use compositions containing thiazoles for fighting the common house fly, or so impregnate animal textile materials with thiazoles to kill moths or other insects feeding thereon.

I claim:

1. An insecticide comprising an organic substance containing in its molecule a five membered ring composed of three carbon, one sulfur and one nitrogen atom, one of said carbon atoms carrying a salt forming group.

2. An insecticide comprising an organic substance group of substances containing in its molecule the heterocyclic nucleus

in which X is a salt forming group.

3. An insecticide comprising an organic substance containing in its molecule the heterocyclic nucleus

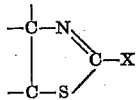

in which X is a salt forming group, and in which the other two carbon atoms are parts of an aromatic ring.

4. An insecticide comprising an aqueous composition containing a spreader and a thiazole containing a salt forming group attached to one of the carbon atoms of the thiazole nucleus.

5. An insecticide comprising an aqueous composition containing a spreader of the class of spreaders consisting of soaps and sulfonated oils and a thiazole containing a salt forming group attached to one of the carbon atoms of the thiazole nucleus.

6. An insecticide comprising a thiazole of the formula

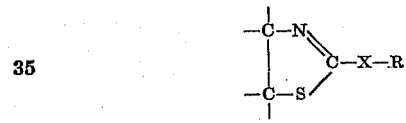

in which X is one of the elements N, O and S and R is hydrogen or an atom or atom grouping which can replace hydrogen when it exercises its acidic functions.

7. An insecticide comprising a thiazole of the formula

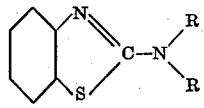

in which R is hydrogen, a hydrocarbon or an acyl radical.

8. An insecticide comprising a thiazole of the formula

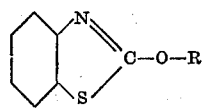

in which R is hydrogen or an atom or atom grouping which can replace hydrogen when it exercises its acidic functions.

9. An insecticide comprising a thiazole of the formula

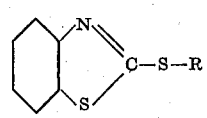

in which R is hydrogen or an atom or atom grouping which can replace hydrogen when it exercises its acidic functions.

ELMER K. BOLTON.